Aug. 1, 1967        E. W. KING        3,333,339

DE-BONING KNIFE

Filed Oct. 18, 1965

Emma W. King,
INVENTOR.
BY
ATTORNEY.

United States Patent Office 3,333,339
Patented Aug. 1, 1967

3,333,339
DE-BONING KNIFE
Emma W. King, 383 E. 2nd, Rialto, Calif. 92376
Filed Oct. 18, 1965, Ser. No. 496,759
2 Claims. (Cl. 30—299)

ABSTRACT OF THE DISCLOSURE

A two-bladed knife with straight principal blade, having forward cutting element, communicating at spaced distance with V shaped cutting element to cut substantially perpendicular to said principal blade.

This invention relates generally to a knife adapted for removal of bones from meat of various kinds and more particularly to such a device that has one cutting blade structurally communicating with a perpendicularly disposed plane-like boning blade. The principal blade has a forward arcuate cutting element and back element structurally carrying a substantially perpendicular connecting shaft positioning at a spaced distances a V shaped planer-like blade having forward cutting surfaces to cut substantially perpendicular to the principal blade. The structure is adapted particularly to de-bone meat with the principal blade opening a channel to underlying bone and the planer blade severing the tissue from the bone.

Since the bone in meat is generally not suitable for human consumption and yet relatively voluminous in proportion to the eatable parts of meat and oftentimes difficult to deal with in handling and storage, it has been an ever-present problem in the art of meat handling to remove the bone from the softer edible tissue.

This problem has been previously considered and various specialized knives, adapted to accomplish the deboning operation, have become known. These knives heretofore have devolved in primarily two classes: firstly those of a single substantially planar blade, variously shaped and sized to aid in accomplishing its purpose, and, secondly, those having multiple blades, generally two, disposed at substantially perpendicular positions with reference to the primary cutting planes of each. Problems have existed with each of the members of the classes of devices stated. In the case of the first class of single bladed knives, since an incision must be made through adjacent flesh to arrive at the bone, it is relatively difficult to move the single blade about the bone to loosen the flesh in connection with it, since the blade is restrained to a degree, at least within the plastic limits of the meat, to the cut normal to the bone already made; if multiple cuts be used to debone a particular piece, the result tends to be an excessive shreading of the flesh. In the second class, that of multiple bladed deboners, the aforesaid problem is somewhat alleviated, but only most efficiently if the two blades be of proper shape and with cutting edges in proper relationship to each other.

The instant invention seeks to provide a new and novel device of the second class herein mentioned wherein the various cutting edges are appropriately shaped and positioned. In so doing it is:

A principal object of my invention to provide a deboning device of the nature aforesaid having two blades structurally communicating in such fashion that the cutting edges of each, and surfaces supporting them, are substantially normal to each other.

It is a further object of my invention to provide a device of the nature aforesaid that has one knife-like blade in combination with one V shaped planer-like blade disposed as aforesaid at a spaced distance.

It is a still further object of my invention to provide a device of the nature aforesaid that may be readily used as an ordinary paring knife and a fruit and vegetable knife in addition to its functions as a deboner.

It is a still further object of my invention to provide a device of the nature aforesaid that is of new and novel design, of simple and durable construction, and of economic manufacture.

Other and further objects of my invention will appear from the following specification and claims and appended drawings which form a part of this application.

In the accompanying drawings, which form a part of this application, and in which like numbers of reference refer to similar parts throughout;

Figure 1:
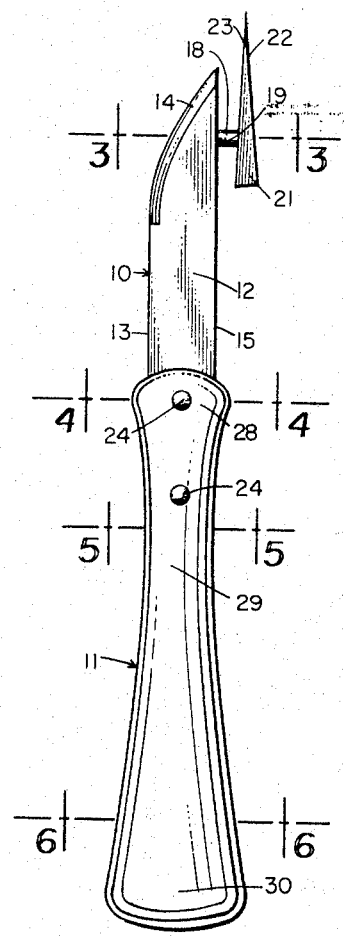
FIGURE 1 is an orthographic side view of my invention, showing its various parts, their configuration and relationship.

Referring now to the drawings in greater detail, and particularly to that of FIGURE 1, it will be seen that my invention comprises essentially the blade structure, designated generally as 10, including the straight blade 12 and planing blade 21, structurally communicating with the handle member designated generally as 11.

Figure 7:
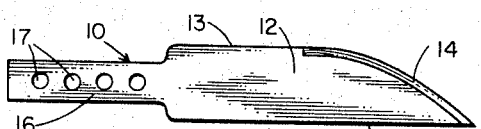
FIGURE 7 is an orthographic plan view of the paring blade of my invention removed from the entire invention.

The straight blade 12 is best illustrated in FIGURE 7. It includes fastening shaft 16 having spaced holes 17 for rivets to aid in attachment to handle member 11. Cutting side 13 of the blade has forwardly curved portion 14 communicating with back 15. Curved part 14 of the blade is sharpened and if desired, the straight portion 13 may also be sharpened though this is not necessary for the deboning operation. This blade should be constructed from some appropriate metal, as well known in the art, that is sufficiently hard to form a sharpened edge and reasonably maintain this sharpness.

Figure 8:
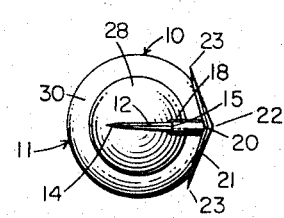
FIGURE 8 is an orthographic front-end view of my invention showing the relationship and configuration of the various parts from this viewpoint.

Planing blade 21 is formed substantially as illustrated particularly in FIGURE 8 by two planar side members angularly disposed with reference to each other meeting at apex 22; the plan view of the blade is substantially the arrowhead illustrated. This blade is sharpened along its forwardly curving outer edges 23 to there form a cutting surface. Again, this blade should be formed from some appropriate knife material as afore-described.

Figures 2, 3:
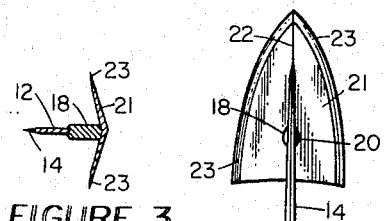
FIGURE 2 is an orthographic top view of the invention of FIGURE 1, again disclosing the invention from this viewpoint.
FIGURE 3 is an orthographic cross-sectional view of FIGURE 1, taken on the line 3—3 thereon in the direction indicated by the arrows, showing the specific structure of the blades.
Figure 4:
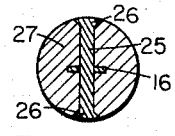
FIGURE 4 is an orthographic cross-sectional view of FIGURE 1, taken on the line 4—4 thereon in the direction indicated by the arrows.
Figure 5:
FIGURE 5 is an orthographic cross-sectional view of FIGURE 1, taken on the line 5—5 thereon in the direction indicated by the arrows.
Figure 6:
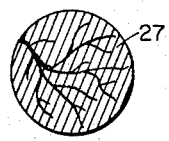
FIGURE 6 is an orthographic cross-sectional view of FIGURE 1, taken on the line 6—6 thereon in the direction indicated by the arrows.

The planing blade is structurally fastened to the back 15 of straight blade 12 by connecting shaft 18, preferably of a substantially elliptical cross section with major axis parallel to the longer axis of straight blade 12. Connector shaft 18 is joined to the back of blade 12 by blade-weld 19 near the outer extremity of the back as illustrated, and to planar blade 21 along the apex 22, slightly rearwardly of the center thereof, all as illustrated in FIGURES 1 and 2.

The knife handle 11 should be substantially of the shape illustrated with forward knob 28, smaller, middle handle portion 29 and larger rearward knob 30. The dimensions and sizing of this handle should be such as to allow for comfortable manual manipulation thereof. For ease and construction, I prefer to form it as a solid of revolution, though this design is, of course, purely a matter of choice.

An appropriate recess is milled in the forward central part of handle 11 to receive shank 16 of straight blade 12. The blade is inserted therein and preferably structurally united therewith by means of an appropriate adhesive (not shown). The blade is further maintained within handle member 11 by means of rivets 24 established in the forward part of the member as illustrated and passing through one of the holes 17 in the shank 16 of straight blade 12.

In operation the knife is inserted into a piece of meat, toward the bone, (not shown) with the plane blade 21 pointing toward the nearest surface of the bone in question. In so doing the cutting edges of the two blades 12, 21 will form a passageway for the balance of the knife. As the planing blade 21 approaches the bone, it may be run along the nearer surface to sever the flesh therealong and in so doing, the straight blade 12 will form a channel in the surrounding flesh for passage of the device. After the bone is laid open in this fashion, the planing blade may be again used to sever more flesh adjacent the initial cut and the process repeated until the piece of meat is entirely deboned.

With this procedure it is to be noted that flesh may be removed from the bone with only one primary cut initially severing the mass of flesh into a two-sided surface topologically speaking.

It is further to be noted that straight blade 12 may be used in the same fashion as an ordinary paring knife in most aspects and that the planing blade 21, particularly its pointed end, is quite adaptable to removing stems, blemishes and the like from various fruits and vegetables.

While the foregoing description is necessarily of a detailed specific character so that a specific embodiment of my invention may be clearly set forth as required by law, it is to be understood that various re-arrangements of parts, multiplications thereof and modifications of detail may be made in connection with the invention without departing from its spirit, scope or essence.

Having thusly described my invention, what I desire to protect by Letters Patent, and,

What I claim is:

1. A de-boning knife of the nature aforesaid, comprising, in combination:

a handle member including a rearward enlargement, a central smaller portion adapted to be manually held and a forward enlargement to aid in the manual manipulation thereof, structurally communicating with a blade member comprising;

a straight blade structurally communicating with and projecting forwardly from said handle member, having a forward curved portion communicating with a straight back part, with at least said forward curved portion being sharpened;

a connecting shaft structurally communicating with the back of said straight blade near the joinder of the curved sharpened part therewith, projecting substantially normally therefrom and communicating at a spaced distance with;

a planing blade having two angularly disposed side parts meeting in a central apex, said side parts being substantially of the shape of a quadrate of a parabola and having the curved portion thereof sharpened.

2. In a two-bladed de-boning knife of the nature aforesaid, the combination of:

a straight blade having a forward curved part communicating with a back, with at least said forward curved part being sharpened;

a relatively small elongate connecting shaft structurally communicating substantially perpendicularly from the medial part of the back of said straight blade a spaced distance to the medial part of the apex of a V shaped planing blade having forwardly facing cutting faces angled toward said straight blade.

References Cited
UNITED STATES PATENTS

| | | | |
|---|---|---|---|
| 509,515 | 11/1893 | Dietz | 30—24 |
| 612,131 | 10/1898 | Henderson | 30—353 |
| 1,967,479 | 7/1934 | Platts | 30—342 X |
| 2,375,751 | 5/1945 | Champlin et al. | 30—342 |
| 2,549,326 | 4/1951 | Moore | 30—34 |
| 2,659,144 | 11/1953 | Conkle | 30—353 |

JAMES L. JONES, JR., *Primary Examiner.*